United States Patent [19]

Schulein, Jr.

[11] 4,296,709
[45] Oct. 27, 1981

[54] ANIMAL LITTER PREPARATION

[75] Inventor: Benjamin M. Schulein, Jr., St. Louis, Mo.

[73] Assignee: Alfa-Pet, Inc., St. Louis, Mo.

[21] Appl. No.: 51,209

[22] Filed: Jun. 22, 1979

[51] Int. Cl.³ ............................................. A01K 1/015
[52] U.S. Cl. ....................................................... 119/1
[58] Field of Search ............................................. 119/1

[56] References Cited

U.S. PATENT DOCUMENTS

| | | |
|---|---|---|
| 3,059,615 | 10/1962 | Kuceski et al. ........................ 119/1 |
| 3,286,691 | 11/1966 | McFadden .............................. 119/1 |
| 3,425,397 | 2/1969 | Schulein et al. ........................ 119/1 |
| 3,735,734 | 5/1973 | Pierce et al. ............................ 119/1 |
| 3,789,797 | 2/1974 | Brewer .................................... 119/1 |
| 3,821,346 | 6/1974 | Batley, Jr. ........................... 119/1 X |
| 3,941,090 | 3/1976 | Fry ......................................... 119/1 |

Primary Examiner—Hugh R. Chamblee
Attorney, Agent, or Firm—Kalish & Gilster

[57] ABSTRACT

A preparation for animal litters for absorbing animal waste material consisting of a chlorophyll-containing agent, such as, alfalfa, and corncob grits.

6 Claims, No Drawings

ANIMAL LITTER PREPARATION

BACKGROUND AND SUMMARY OF THE INVENTION

Heretofore numerous efforts have been undertaken to develop effective litters for animals, particularly house pets. Such efforts for the most part have involved the creation of litters of relatively complex compositions, comprehending the incorporation of chemical treatment agents for destroying bacteria which might be present in the animal excretions and/or in the components of the litter; for neutralizing compounds within such excretions and material resulting from decomposition therefrom; and for eliminating or minimizing any developed odors. Consistently there have been encountered problems in determining the appropriate compositions and preparations to constitute such litters in order to achieve the desired absorptivity; the resistance to decomposition; and a weight conducive to shipment and yet not sufficiently light so that constituent particles will tend to adhere to the animal, as on the paws or the fur for ultimate gravitational disposition on the surrounding area with resultant untidiness.

Among the various prior art efforts is the animal litter disclosed in U.S. Pat. No. 3,059,615 wherein one of the ingredients is an acidic cellulosic material including, among others, corncob grits. However, such materials used were treated with phosphoric acid and aqueous solutions of monosodium phosphate dehydrate for the purpose of providing a specific pH, as of no less than approximately 2.5 and, preferably, no higher than 3.5, although such might approach 6.5. It was found that a pH below 2.5 would be harmful to the skin of the animals and with the portion of the range thereabove being adequate to provide the requisite neutralization capacity for basic excretory matter, such as, ammonia and amine of animal urines, and for basic decomposition matter produced from the decay of animal feces. It was indicated that other acids and bases could be used as the phosphoric acid was easily buffered within the 2.5 to 6.5 range. Thus, this patent exemplarily demonstrates the resort to the utilization of chemical compositions in animal litters.

U.S. Pat. No. 3,425,397 also reveals an animal litter preparation but is revelatory of earlier efforts at developing animal litters which did not require chemicals, but relied merely upon the intermixture of fundamental ingredients, such as, a lightweight absorptive agent, as vermiculite or perlite, and a chlorophyll-containing agent, such as, alfalfa, algae, broom grass and timothy grass. However, the vermiculite and perlite, being of exceedingly light weight, proved in practice to tend to adhere to the animal and, thus, despite the other attributes thereof, provided a recognized drawback.

Therefore, it is an object of the present invention to provide an animal litter preparation which consists of the intermixture of two naturally occurring solid compositions, each of which is most economically produced with one being substantially normally a waste material.

It is another object of the present invention to provide an animal litter preparation which does not comprehend the utilization of chemical agents, compounds or preparations so that the manufacture of the litter of the present invention may be easily and economically effected by the mere physical mixing of but two dried solid ingredients thereby obviating the costs of chemical treatment agents, as well as the problems associated with the metering of the same within the prescribed limits within the batch being formed.

It is another object of the present invention to provide an animal litter preparation of the character stated which may be produced without the exercise of skilled, highly trained individuals and which is, hence, amenable to high volume, low cost commercial production, with the sources for the ingredients being naturally occurring.

It is another object of the present invention to provide an animal litter preparation of the character stated, and being of predetermined particulate nature, wherein the particles, although highly absorptive to received liquid, will return to natural size from initial expanded state upon reception; and which particles are resistant to decomposition through subjection to absorbed chemicals so that the preparation is adapted for longevity of usage without diminution in effectiveness.

It is another object of the present invention to provide an animal litter preparation of the character stated which is highly efficient and reliable in usage for waste absorption and odor elimination.

DESCRIPTION OF THE INVENTION

In essence, this invention resides in the provision of a litter preparation which consists of a chlorophyll-containing agent, such as, alfalfa, and corncob grits, which components are of preselected particle size, being intermixed in a dry form under ambient conditions.

In order to prepare a litter in accordance with the present invention, the chlorophyll-containing agent may be from the group consisting of alfalfa, algae, broom grass and timothy grass, but the agent of choice is alfalfa which has been pelletized, in accordance with custom practice, to provide pellets having a length within the range of $\frac{1}{4}''$ to $\frac{1}{2}''$ and a diameter of approximately $\frac{1}{8}''$ to $3/16''$; it being recognized that alfalfa possesses a relatively high chlorophyll content. Thus, the chlorophyll, which is the active ingredient of the alfalfa for the purposes of this invention, is in natural state.

The other component, that being ground corncob grits, which hard particles are from the woody ring surrounding the soft, central core or pith of the cob, and which externally supports the sockets holding the corn kernels. As is well known, corncob grit is more dense than the other portions of the cob having a bulk density range of from about 15 to 30 pounds per cubic foot, depending upon the particle size. The provision of the corncob grit particles is effected pursuant to well known techniques involving various grinding, and separation from the other corncob components, categorically referred to as "beeswing" which is a fairly soft and light product formed of the kernel sockets and the pith. Beeswing is considerably lighter than grit ranging from 8 to 15 pounds per cubic foot, being also dependent upon particle size.

The grit is ground to a mesh size broadly within the range of 4 to 20 but, preferably, 8 to 14, with 8 being the designation of choice.

The pelletized alfalfa and the ground grit is intermixed, in a dry state, under ambient conditions within a range of between 1 to 1 or equal parts by weight, and 7 parts by weight of grit to 3 parts by weight of the pelletized alfalfa. Thus, the composition per 100 pounds could be 50 pounds of each to 70 pounds of grits to 30 pounds of the alfalfa.

This particular intermixture, in actual use, has proved to be exceedingly effective and efficient with respect to accepting animal excretions; as such components, although tending to swell or expand upon absorption of liquid, will return to natural size, thus conducing to longevity of usage. This expansion and retraction capacity of corncob grits until the present invention was not recognized as the density thereof appeared to indicate an inability to provide this critical attribute. Furthermore, such uniquely combined constituents do not, as it were, lose identity in use as the same are resistant to decomposition; which property, understandably, obviates the need to replace or replenish the litter with any degree of frequency. Also, it has been discovered that the particles are resistant to caking or coalescing.

Interestingly, the litter of the present invention has proved in actual practice to possess a relatively high degree of porosity productive of an absorbency greater than the usual inert clays, such as fullers earth, etc., all of which heretofore have had wide usage in the litter field.

In view of the unusual density of the primary component, namely corncob grits, sufficient weight is accorded the litter so that it does not tend to stick or in any way adhere to the animal with the usual consequent untidy distribution to the surrounding area.

The odor neutralizing and absorptive properties of the litter constituents are such as to render the present invention especially suitable for utilization with cats, with such use having been manifestly established.

In view of its composition and physical characteristics the present invention may be readily discarded as by flushing down a drain, so that the replacement procedure may be easily effected with minimum effort and especially so since the litter components do not have a tendency to stick or otherwise adhere to the receptacle.

It should be understood that changes in the methods, compositions, percentages and combinations set forth may be made without departing from the nature and principle of this invention.

Having described my invention, what I claim and desire to obtain by Letters Patent is:

1. An animal litter consisting essentially of a chlorophyll-containing agent from the class consisting of alfalfa, algae, broom grass and timothy grass, and a relatively high density cellulosic agent consisting of corncob grits, said chlorophyll-containing agent and said grits being physically intermixed in a dry, discrete state, said intermixture being free of chemical agents, compounds, and preparations, said grits constituting between approximately 50% to 70% by weight of the litter and said chlorophyll-containing agent constituting approximately 50% to 30% of the litter.

2. An animal litter as defined in claim 1 and further characterized by the chlorophyll-containing agent being pelletized alfalfa.

3. An animal litter as defined in claim 1 and further characterized by said corncob grits having a mesh size within the range of 4-20.

4. An animal litter as defined in claim 1 and further characterized by said corncob grits having a mesh size of approximately 8-14.

5. An animal litter as defined in claim 1 and further characterized by said chlorophyll-containing agent being pelletized alfalfa wherein the pellet length is approximately $\frac{1}{4}''$ to $\frac{1}{2}''$ and the diameter is approximately $\frac{1}{8}''$ to 3/16" and said corncob grits being in particle form within a proximate range of 8-14 mesh size.

6. An animal litter consisting essentially of pelletized alfalfa wherein the pellet length is approximately $\frac{1}{4}''$ to $\frac{1}{2}''$ and the diameter is approximately $\frac{1}{8}''$ to 3/16", and corncob grits being of a particle form within a range of 8 to 14 mesh size, said pelletized alfalfa and said grit particles being physically intermixed in a dry state, said intermixture being free of chemical agents, compounds, and preparations, said grits constituting between approximately 50% to 70% by weight of the litter and said pelletized alfalfa constituting approximately 50% to 30% by weight of the litter.

* * * * *